United States Patent [19]

Dabby et al.

[11] 4,298,366

[45] Nov. 3, 1981

[54] GRADED START RODS FOR THE PRODUCTION OF OPTICAL WAVEGUIDES

[75] Inventors: Franklin W. Dabby, Woodbridge; Ronald B. Chesler, Cheshire, both of Conn.

[73] Assignee: Times Fiber Communications, Inc., Wallingford, Conn.

[21] Appl. No.: 57,519

[22] Filed: Jul. 13, 1979

[51] Int. Cl.³ .................... C03C 37/075; G02B 5/172
[52] U.S. Cl. ................................. 65/3.12; 350/96.31
[58] Field of Search ............... 350/96.30, 96.31, 96.34; 65/2, 3 R, 3 A, 13, 3.1, 3.11, 3.12

[56] References Cited

U.S. PATENT DOCUMENTS

| | | | |
|---|---|---|---|
| 3,823,995 | 7/1974 | Carpenter | 350/96.31 |
| 3,826,560 | 7/1974 | Schultz | 350/96.31 |
| 3,843,229 | 10/1974 | Rosenberger | 350/96.31 |
| 3,932,160 | 1/1976 | Camlibel et al. | 65/3 A |
| 3,989,350 | 11/1976 | Cohen et al. | 350/96.31 |
| 4,141,710 | 2/1979 | Aulich et al. | 65/3 A |
| 4,161,505 | 7/1979 | Shiraishi et al. | 65/3 A X |
| 4,165,152 | 8/1979 | Shiraishi et al. | 350/96.30 |

*Primary Examiner*—John D. Lee

[57] ABSTRACT

A process for preparing a glass rod having a graded refractive index for use as the start rod in the production of optical waveguides is disclosed. The process comprises depositing and sintering borosilicate particles on a glass rod to form a rod having a larger diameter than the original fused silica rod and drawing this rod to obtain a start rod having the same diameter as the original glass rod but exhibiting a partially radially graded refractive index. Optical waveguides prepared from such graded start rods have a more uniformly graded radial index of refraction profile.

8 Claims, No Drawings

GRADED START RODS FOR THE PRODUCTION OF OPTICAL WAVEGUIDES

BACKGROUND OF THE INVENTION

1. Field of the Invention

The present invention is directed to a graded start rod used to prepare glass preforms which are subsequently drawn into optical waveguides.

2. Description of the Prior Art

During the past decade, a great deal of work has been undertaken directed to the manufacture of glass transmission lines for visible and near-visible electromagnetic radiation, commonly referred to as optical waveguides. In brief, optical waveguides are extremely thin, flexible glass fibers, prepared by drawing glass preforms under controlled conditions. Although these conditions are subject to wide variation, depending upon such factors as the composition of the glass and the drawing procedure, the optical waveguide so prepared will comprise, in its simplest form, a glass core of a given, constant diameter, surrounded by a glass cladding having an index of refraction less than that of the glass core. The cladding acts as a barrier which confines the light to the core.

While the drawing procedure is important in obtaining a properly functioning optical waveguide, it is the production of the glass preform which is drawn into the fiber which controls the ultimate composition and hence transmission properties of the waveguide. While numerous methods have been proposed for preparing such preforms, their goal is the same, i.e., the production of a structure having a core area of a given refractive index, surrounded by a cladding having a lower refractive index to inhibit the attenuation of light being transmitted through the core.

In particular, two types of construction have been suggested. The simplest comprises a cylindrical core having a constant index of refraction, surrounded by a cladding of a constant, but lower, index of refraction. The structure may be modified by addition of other cladding layers of progressively lower, constant indices of refraction to form a step-like construction. The second type of preform construction comprises a core area of graded index of refraction, surrounded by a cladding having a refractive index which is constant and lower than the refractive index of the core.

The manufacture of optical waveguide preforms are accomplished in a number of ways. For example one method, described in U.S. Pat. No. 3,932,160, accomplishes deposition of a borosilicate layer on a pure silica start rod by high temperature pyrolysis of a mixture of silane or silicon halides and borane. This method produces an acicular deposit of borosilicate glass which exhibits a lower index of refraction than the pure silica core.

The methods for manufacturing optical waveguide preforms by forming a cladding on a start rod of uniform composition suffer a common deficiency. As the diameter of the start rod must be sufficiently wide, generally about 3 mm, to insure that it is capable of withstanding the stress of processing, it forms a relatively large central area having a constant index of refraction. This central area remains proportionally large when the preform is drawn into optical waveguides. However, it has been observed that, in order to minimize dispersion of light passing through the core of optical waveguides, it is desirable to minimize the size of the central area in which the index of refraction is constant. Ideally, a waveguide having a core which exhibits a radially decreasing index of refraction is preferred.

SUMMARY OF THE INVENTION

Accordingly, it is a primary objective of the present invention to provide a preform for drawing into optical waveguides which exhibit a significantly reduced central area of constant refractive index.

Another object of the invention is to produce optical waveguides which also have significantly reduced central areas of constant refractive indices and hence increased bandwidth capabilities.

Other objects and advantages of the present invention will become apparent to those of skill in the art upon review of the detailed description herein.

The foregoing objects and advantages are achieved by a method for preparing optical waveguide preforms utilizing a graded start rod. Unlike start rods heretofore employed, the rod of the present invention is not uniform in composition but constructed so as to exhibit a radially decreasing index of refraction and a minimal central area of constant refractive index. Preforms are prepared from the graded start rod by controlled deposition of glass particulate of the start rod to maintain the radially decreasing refractive index profile. Upon drawing, optical waveguides are obtained having greatly reduced central areas of constant refractive index.

DETAILED DESCRIPTION OF THE INVENTION

According to a preferred embodiment of the present invention, the graded start rod is prepared by depositing and sintering borosilicate particles on a pure fused silica rod. The borosilicate particles are produced by high temperature pyrolysis of a gaseous mixture of a silicon-containing reactant such as silicon tetrachloride, silicon tetrabromide or silane with a boron-containing reactant such as boron trichloride, boron tribromide or borane. Temperatures required to effect the pyrolysis reaction are produced by conducting the deposition in a reaction furnace which heats both the gaseous mixture of reactants and the silica rod. Alternately, the appropriate temperature can be obtained by directing the reactants through a natural gas flame. The composition of the borosilicate particulate is controlled by adjusting the flow of the reactant gases, particularly the boron-containing reactant, which is preferably boron trichloride, which is subjected to high temperature pyrolysis. The particulate is deposited uniformly along the length of the silica rod by controlled rotation and translation of the rod. As deposition proceeds, the flow of boron trichloride to the pyrolysis reaction is gradually increased with respect to the silicon tetrachloride, which in turn increases the concentration of boron oxide in the borosilicate particulate deposited on the translating and rotating rod. In this manner a borosilicate deposit having radially increasing concentrations of boron oxide relative to silica is obtained.

Typically, a pure fused silica rod having a diameter of about 3 to 6 mm is used. The borosilicate particle is deposited as described above to increase the diameter of the rod to about 6 to 12 mm. The particulate is sintered after deposition is completed and the sintered composite is drawn to reduce its diameter to about 3 to 6 mm.

According to a preferred embodiment of the present invention, the borosilicate particulate deposited on the original pure fused silica rod is continuously sintered as it is deposited. This is accomplished by providing at least one independent source of heat, just beyond the point of deposition of the particulate, such as a cylindrical furnace surrounding a portion of the glass rod. Deposited particulate is sintered each time the rod translates through the independent heat source. In the most preferred embodiment, an independent heat source is positioned on each side of the point of deposition of the particulate on the rod. In this manner, the particulate is continuously deposited on a sintered layer of the particulate which was deposited on the previous pass through the particulate stream. This continuous sintering enhances the uniformity of the preform. The temperature of the heat source is dependent upon the composition of the particulate and generally varies between about 500° to 1550° C. It is also preferable to conduct the sintering operation under an atmosphere of helium to inhibit the formation of bubbles in the borosilicate deposit.

In preparing a preform from the graded start rod of the invention, borosilicate particles having a composition corresponding to that at the surface of the start rod is uniformly deposited along the length of the rod in the same manner employed to prepare the composite which is drawn into the graded start rod. The flow of boron trichloride to the high temperature pyrolysis reaction is adjusted so as to achieve a borosilicate particulate which, when deposited, exhibits an increasing compositional profile of boron oxide relative to silica. Finally, a region of constant refractive index is deposited to comprise the cladding of the waveguide. The ratio of the boron oxide to silica in the particulate varies from an initial value corresponding to the ratio at the surface of the rod to a value of approximately 3 or more at the surface of the preform. The borosilicate particulate deposited on the rod is sintered in the manner described in regard to the preparation of the graded start rod. Drawing of the glass preform is accomplished in a separate drawing furnace where the preform is heated to the drawing temperature and drawn into fiber, as is well known to those of skill in the art.

The method for preparing the graded start rod, preform and optical waveguides of the present invention may be fully automated and electronically coordinated.

By utilizing the graded start rod of the present invention, a more completely graded core for a waveguide is obtained than heretofore possible. In such waveguides, less than 10% of the cross-sectional area comprises a region of constant refractive index. The optical waveguides produced in this manner thus exhibit enhanced bandwidth capabilities due to reduced dispersion of pulses travelling through the core of the waveguide.

While the present invention has now been described in terms of certain preferred embodiments, the skilled artisan will readily appreciate that various modifications, changes, omissions and substitutions may be made without departing from the spirit thereof. It is intended, therefore, that the present invention be limited solely by the scope of the following claims.

What is claimed is:

1. A process for the production of optical waveguides which comprises preparing a preform by depositing and sintering borosilicate particles on a cylindrical glass rod, heating said preform to the drawing temperature and drawing said preform into optical waveguides, wherein said cylindrical glass rod comprises a central area of constant refractive index and an outer region of varying refractive index and wherein said cylindrical glass rod is prepared by the process comprising depositing and sintering borosilicate particles on a pure fused silica glass rod and drawing the resulting composite to obtain a graded start rod of about the same diameter as the original pure fused silica rod.

2. The process as defined by claim 1, wherein said cylindrical glass rod comprises a pure fused silica central area and a borosilicate outer region having radially increasing proportions of boron oxide relative to silica.

3. The process as defined by claim 2, wherein said borosilicate outer region exhibits an increasing ratio of boron oxide to silica with radial distance from the pure fused silica core.

4. The process as defined by claim 1, wherein the diameter of said pure fused silica rod is about 3 to 6 mm.

5. The process as defined by claim 1, wherein the diameter of said composite prior to drawing is about 6 to 12 mm.

6. The process as defined by claim 1, wherein said borosilicate particles are produced by high temperature pyrolysis of a first gaseous reactant selected from the group consisting of $SiH_4$, $SiCl_4$ and $SiBr_4$ and a second gaseous reactant selected from the group consisting of $B_2H_6$, $BCl_3$ and $BBr_3$.

7. The process as defined by claim 6, wherein said reactants are $SiCl_4$ and $BCl_3$.

8. The process as defined by claim 6, wherein said high temperature pyrolysis is conducted as a flame pyrolysis by burning natural gas in the presence of oxygen.

* * * * *